US007621814B2

(12) United States Patent
Garcia

(10) Patent No.: US 7,621,814 B2
(45) Date of Patent: Nov. 24, 2009

(54) MEDIA ENHANCED GAMING SYSTEM

(75) Inventor: Thomas Eugene Garcia, Dacula, GA (US)

(73) Assignee: Scientific Games International, Inc., Newark, DE (US)

( * ) Notice: Subject to any disclaimer, the term of this patent is extended or adjusted under 35 U.S.C. 154(b) by 0 days.

(21) Appl. No.: 11/186,464

(22) Filed: Jul. 20, 2005

(65) Prior Publication Data

US 2006/0019751 A1 Jan. 26, 2006

Related U.S. Application Data

(60) Provisional application No. 60/590,255, filed on Jul. 22, 2004.

(51) Int. Cl.
*G06F 17/00* (2006.01)
*G06F 19/00* (2006.01)

(52) U.S. Cl. ................................ 463/42; 463/1; 463/16; 463/29; 463/30; 463/31; 463/40; 463/41; 463/43; 725/87; 725/91; 725/97; 725/103; 725/105

(58) Field of Classification Search ..................... 463/1, 463/16, 29–31, 40–43; 725/87, 91, 97, 103, 725/105
See application file for complete search history.

(56) References Cited

U.S. PATENT DOCUMENTS 1,527,929 A 2/1925 Simons
3,089,123 A 5/1963 Hennis et al.
3,245,697 A 4/1966 BNugent
3,699,311 A 10/1972 Dunbar
3,736,368 A 5/1973 Vogelman et al.
3,826,499 A 7/1974 Lenkoff
3,868,057 A 2/1975 Chavez
3,876,865 A 4/1975 Bliss
3,902,253 A 9/1975 Sabuzawa et al.
3,918,174 A 11/1975 Miller et al.
3,922,529 A 11/1975 Orloff
3,934,120 A 1/1976 Maymarev
4,017,834 A 4/1977 Cuttill et al.
4,095,824 A 6/1978 Bachman (Continued)

FOREIGN PATENT DOCUMENTS

AU B-18428/92 12/1992

(Continued)

OTHER PUBLICATIONS

'Are You In?', (Article), Feb. 20, 1998.

(Continued)

*Primary Examiner*—Peter DungBa Vo
*Assistant Examiner*—Milap Shah
(74) *Attorney, Agent, or Firm*—Dority & Manning, P.A.

(57) ABSTRACT

An integrated group of systems, processes, and controls that enable real-time/near real-time media (video and audio) enhancement and capabilities in a gaming environment. Media from a variety of sources may be streamed or pushed to either individual gaming terminal devices, a group of these devices, or an entire network of such units. Additional system functionality allows for two-way interactive visual and audio communications between gaming terminal users/operators and call center personnel as well as providing a standard interface to interact with existing retail sales-oriented equipment that may exist at the installation location.

12 Claims, 8 Drawing Sheets

U.S. PATENT DOCUMENTS 4,105,156 A 8/1978 Dethloff
4,176,406 A 11/1979 Matkan
4,191,376 A 3/1980 Goldman et al.
4,194,296 A 3/1980 Pagnozzi et al.
4,195,772 A 4/1980 Nishimura
4,206,920 A 6/1980 Weatherford et al.
4,241,942 A 12/1980 Bachman
4,243,216 A 1/1981 Mazumder
4,273,362 A 6/1981 Carrier et al.
4,309,452 A 1/1982 Sachs
4,313,087 A 1/1982 Weitzen et al.
4,355,300 A 10/1982 Weber
4,375,666 A 3/1983 Buck et al.
4,398,708 A 8/1983 Goldman et al.
4,407,443 A 10/1983 McCorkle
4,451,759 A 5/1984 Heynisch
4,455,039 A 6/1984 Weitzen et al.
4,457,430 A 7/1984 Darling et al.
4,464,423 A 8/1984 LaBianca et al.
4,466,614 A 8/1984 Bachman et al.
4,488,646 A 12/1984 McCorkle
4,491,319 A 1/1985 Nelson
4,494,197 A 1/1985 Troy et al.
4,536,218 A 8/1985 Ganho
4,544,184 A 10/1985 Freund et al.
4,579,371 A 4/1986 Long et al.
4,591,189 A 5/1986 Holmen et al.
4,634,149 A 1/1987 Donovan
4,665,502 A 5/1987 Kreisner
4,669,729 A 6/1987 Solitt et al.
4,689,742 A 8/1987 Troy et al.
4,726,608 A 2/1988 Walton
4,736,109 A 4/1988 Dvorzsak
4,740,016 A 4/1988 Konecny et al.
4,760,247 A 7/1988 Keane et al.
4,763,927 A 8/1988 Schneider
4,775,155 A 10/1988 Lees
4,792,667 A 12/1988 Chen
4,805,907 A 2/1989 Hagiwara
4,817,951 A 4/1989 Crouch et al.
4,835,624 A 5/1989 Black et al.
4,836,546 A 6/1989 Dire et al.
4,836,553 A 6/1989 Suttle et al.
4,837,728 A 6/1989 Barrie et al.
4,856,787 A 8/1989 Itkis
4,861,041 A 8/1989 Jones et al.
4,870,260 A 9/1989 Niepolomski et al.
4,880,964 A 11/1989 Donahue
4,888,244 A 12/1989 Masubuchi et al.
4,922,522 A 5/1990 Scanlon
4,943,090 A 7/1990 Fienberg
4,960,611 A 10/1990 Fujisawa et al.
4,961,578 A 10/1990 Chateau
4,964,642 A 10/1990 Kamille
4,996,705 A 2/1991 Entenmann et al.
4,998,010 A 3/1991 Chandler et al.
4,998,199 A 3/1991 Tashiro et al.
5,032,708 A 7/1991 Comerford et al.
5,037,099 A 8/1991 Burtch
5,046,737 A 9/1991 Fienberg
5,074,566 A 12/1991 Desbiens
5,083,815 A 1/1992 Scrymgeour et al.
5,092,598 A 3/1992 Kamille
5,094,458 A 3/1992 Kamille
5,100,139 A 3/1992 Di Bella
5,109,153 A 4/1992 Johnsen et al.
5,112,050 A 5/1992 Koza et al.
5,116,049 A 5/1992 Sludikoff et al.
5,118,109 A 6/1992 Gumina
5,119,295 A 6/1992 Kapur
5,158,293 A 10/1992 Mullins
5,165,967 A 11/1992 Theno et al.
5,168,353 A * 12/1992 Walker et al. ............... 725/103
5,186,463 A 2/1993 Marin et al.
5,189,292 A 2/1993 Batterman et al.
5,193,815 A 3/1993 Pollard
5,193,854 A 3/1993 Borowski, Jr. et al.
5,228,692 A 7/1993 Carrick et al.
5,232,221 A 8/1993 Sludikoff et al.
5,234,798 A 8/1993 Heninger et al.
5,249,801 A 10/1993 Jarvis
5,259,616 A 11/1993 Bergmann
5,273,281 A 12/1993 Lovell
5,276,980 A 1/1994 Carter et al.
5,282,620 A 2/1994 Keesee
5,308,992 A 5/1994 Crane et al.
5,317,135 A 5/1994 Finocchio
5,326,104 A 7/1994 Pease et al.
5,332,219 A 7/1994 Marnell, II et al.
5,342,047 A 8/1994 Heidel et al.
5,342,049 A 8/1994 Wichinsky et al.
5,344,144 A 9/1994 Canon
5,346,258 A 9/1994 Behn et al.
5,380,007 A 1/1995 Travis et al.
5,393,057 A 2/1995 Marnell, II et al.
5,401,024 A 3/1995 Simunek
5,401,541 A 3/1995 Hodnett, III
5,403,039 A 4/1995 Borowski, Jr. et al.
5,407,199 A 4/1995 Gumina
5,420,406 A 5/1995 Izawa et al.
5,432,005 A 7/1995 Tanigami et al.
5,451,052 A 9/1995 Behm et al.
5,456,465 A 10/1995 Durham
5,456,602 A 10/1995 Sakuma
5,471,039 A 11/1995 Irwin, Jr. et al.
5,471,040 A 11/1995 May
5,475,205 A 12/1995 Behm et al.
5,486,005 A 1/1996 Neal
5,513,846 A 5/1996 Niederlein et al.
5,528,154 A 6/1996 Leichner et al.
5,536,016 A 7/1996 Thompson
5,540,442 A 7/1996 Orselli et al.
5,548,110 A 8/1996 Storch et al.
5,550,746 A 8/1996 Jacobs
5,560,610 A 10/1996 Behm et al.
5,564,700 A 10/1996 Celona
5,564,977 A 10/1996 Algie
5,591,956 A 1/1997 Longacre, Jr. et al.
5,599,046 A 2/1997 Behm et al.
5,602,381 A 2/1997 Hoshino et al.
5,621,200 A 4/1997 Irwin et al.
5,628,684 A 5/1997 Bouedec
5,630,753 A 5/1997 Fuchs
5,651,735 A 7/1997 Baba
5,655,961 A 8/1997 Acres et al.
5,667,250 A 9/1997 Behm et al.
5,682,819 A 11/1997 Beatty
5,690,366 A 11/1997 Luciano
5,704,647 A 1/1998 Desbiens
5,722,891 A 3/1998 Inoue
5,726,898 A 3/1998 Jacobs
5,732,948 A 3/1998 Yoseloff
5,741,183 A 4/1998 Acres et al.
5,743,800 A 4/1998 Huard et al.
5,752,882 A 5/1998 Acres et al.
5,756,220 A 5/1998 Hoshino et al.
5,768,142 A 6/1998 Jacobs
5,769,458 A 6/1998 Carides et al.
5,770,533 A 6/1998 Franchi
5,772,509 A 6/1998 Weiss
5,772,510 A 6/1998 Roberts
5,772,511 A 6/1998 Smeltzer
RE35,864 E 7/1998 Weingardt
5,779,840 A 7/1998 Boris

| | | | | | |
|---|---|---|---|---|---|
| 5,781,734 | A | * | 7/1998 | Ohno et al. | 725/115 |
| 5,789,459 | A | | 8/1998 | Inagaki et al. | |
| 5,791,990 | A | | 8/1998 | Schroeder et al. | |
| 5,797,794 | A | | 8/1998 | Angell | |
| 5,803,504 | A | | 9/1998 | Deshiens et al. | |
| 5,816,920 | A | | 10/1998 | Hanai | |
| 5,818,019 | A | | 10/1998 | Irwin, Jr. et al. | |
| 5,820,459 | A | | 10/1998 | Acres et al. | |
| 5,823,874 | A | | 10/1998 | Adams | |
| 5,830,063 | A | | 11/1998 | Byrne | |
| 5,830,066 | A | | 11/1998 | Goden et al. | |
| 5,830,067 | A | | 11/1998 | Graves et al. | |
| 5,830,068 | A | * | 11/1998 | Brenner et al. | 463/42 |
| 5,833,537 | A | | 11/1998 | Barrie | |
| 5,835,576 | A | | 11/1998 | Katz et al. | |
| 5,836,086 | A | | 11/1998 | Elder | |
| 5,836,817 | A | | 11/1998 | Acres et al. | |
| 5,848,932 | A | | 12/1998 | Adams | |
| 5,851,149 | A | * | 12/1998 | Xidos et al. | 463/42 |
| 5,863,075 | A | | 1/1999 | Rich et al. | |
| 5,871,398 | A | | 2/1999 | Schneier et al. | |
| 5,876,284 | A | | 3/1999 | Acres et al. | |
| 5,882,261 | A | | 3/1999 | Adams | |
| 5,883,537 | A | | 3/1999 | Luoni et al. | |
| 5,885,158 | A | | 3/1999 | Torango et al. | |
| 5,887,906 | A | | 3/1999 | Sultan | |
| 5,903,340 | A | | 5/1999 | Lawandy et al. | |
| 5,911,418 | A | | 6/1999 | Adams | |
| 5,915,588 | A | | 6/1999 | Stoken et al. | |
| 5,934,671 | A | | 8/1999 | Harrison | |
| 5,970,143 | A | | 10/1999 | Schneier et al. | |
| 5,971,271 | A | * | 10/1999 | Wynn et al. | 235/380 |
| 5,979,894 | A | | 11/1999 | Alexoff | |
| 5,996,997 | A | | 12/1999 | Kamille | |
| 5,997,044 | A | | 12/1999 | Behm et al. | |
| 6,003,307 | A | | 12/1999 | Naber et al. | |
| 6,004,207 | A | | 12/1999 | Wilson, Jr. et al. | |
| 6,004,208 | A | | 12/1999 | Takemoto et al. | |
| 6,007,162 | A | | 12/1999 | Hinz et al. | |
| 6,012,982 | A | | 1/2000 | Piechowiak et al. | |
| 6,014,819 | A | | 1/2000 | Elder | |
| 6,017,032 | A | | 1/2000 | Grippo et al. | |
| 6,024,641 | A | | 2/2000 | Sarno | |
| 6,053,405 | A | | 4/2000 | Irwin, Jr. et al. | |
| 6,077,162 | A | | 6/2000 | Weiss | |
| 6,080,062 | A | | 6/2000 | Olson | |
| 6,086,477 | A | | 7/2000 | Walker et al. | |
| 6,089,978 | A | | 7/2000 | Adams | |
| 6,099,407 | A | | 8/2000 | Parker, Jr. et al. | |
| 6,102,400 | A | | 8/2000 | Scott et al. | |
| 6,107,913 | A | | 8/2000 | Gatto et al. | |
| 6,113,495 | A | * | 9/2000 | Walker et al. | 463/42 |
| 6,119,364 | A | | 9/2000 | Elder | |
| 6,125,368 | A | | 9/2000 | Bridge et al. | |
| 6,142,872 | A | | 11/2000 | Walker et al. | |
| 6,146,272 | A | | 11/2000 | Walker et al. | |
| 6,149,521 | A | | 11/2000 | Sanduski | |
| 6,155,491 | A | | 12/2000 | Dueker et al. | |
| 6,168,521 | B1 | | 1/2001 | Luciano et al. | |
| 6,168,522 | B1 | | 1/2001 | Walker et al. | |
| 6,179,710 | B1 | | 1/2001 | Sawyer et al. | |
| 6,203,430 | B1 | | 3/2001 | Walker et al. | |
| 6,206,373 | B1 | | 3/2001 | Garrod | |
| 6,210,275 | B1 | | 4/2001 | Olsen | |
| 6,217,448 | B1 | | 4/2001 | Olsen | |
| 6,220,596 | B1 | | 4/2001 | Horan | |
| 6,220,961 | B1 | | 4/2001 | Keane et al. | |
| 6,224,055 | B1 | | 5/2001 | Walker et al. | |
| 6,227,969 | B1 | | 5/2001 | Yoseloff | |
| 6,238,288 | B1 | | 5/2001 | Walker et al. | |
| 6,309,300 | B1 | | 10/2001 | Glavich | |
| 6,312,334 | B1 | | 11/2001 | Yoseloff | |
| 6,315,291 | B1 | | 11/2001 | Moody | |
| 6,330,976 | B1 | | 12/2001 | Dymetman et al. | |
| 6,331,143 | B1 | | 12/2001 | Yoseloff | |
| 6,334,814 | B1 | | 1/2002 | Adams | |
| 6,340,158 | B2 | | 1/2002 | Pierce et al. | |
| 6,368,213 | B1 | | 4/2002 | McNabola | |
| 6,375,568 | B1 | | 4/2002 | Roffman et al. | |
| 6,379,742 | B1 | | 4/2002 | Behm et al. | |
| 6,394,899 | B1 | | 5/2002 | Walker et al. | |
| 6,398,214 | B1 | | 6/2002 | Moteki et al. | |
| 6,398,643 | B1 | | 6/2002 | Knowles et al. | |
| 6,398,644 | B1 | | 6/2002 | Perrie et al. | |
| 6,398,645 | B1 | | 6/2002 | Yoseloff | |
| 6,416,408 | B2 | | 7/2002 | Tracy et al. | |
| 6,419,579 | B1 | | 7/2002 | Bennett | |
| 6,435,408 | B1 | | 8/2002 | Irwin, Jr. et al. | |
| 6,435,500 | B2 | | 8/2002 | Gumina | |
| 6,478,677 | B1 | | 11/2002 | Moody | |
| 6,491,215 | B1 | | 12/2002 | Irwin, Jr. et al. | |
| 6,497,408 | B1 | | 12/2002 | Walker et al. | |
| 6,552,290 | B1 | | 4/2003 | Lawandy | |
| 6,588,747 | B1 | | 7/2003 | Seelig | |
| 6,599,186 | B1 | | 7/2003 | Walker et al. | |
| 6,601,772 | B1 | | 8/2003 | Rubin et al. | |
| 6,637,747 | B1 | | 10/2003 | Garrod | |
| 6,648,735 | B2 | | 11/2003 | Miyashita et al. | |
| 6,648,753 | B1 | | 11/2003 | Tracy et al. | |
| 6,648,755 | B1 | | 11/2003 | Luciano et al. | |
| 6,676,126 | B1 | | 1/2004 | Walker et al. | |
| 6,692,354 | B2 | | 2/2004 | Tracy et al. | |
| 6,702,047 | B2 | | 3/2004 | Huber | |
| 6,773,345 | B2 | | 8/2004 | Walker et al. | |
| 6,776,337 | B2 | | 8/2004 | Irwin, Jr. et al. | |
| 6,786,824 | B2 | | 9/2004 | Cannon | |
| 6,823,874 | B2 | | 11/2004 | Lexcen | |
| 6,875,105 | B1 | | 4/2005 | Behm et al. | |
| 6,929,186 | B2 | | 8/2005 | Lapstun | |
| 2001/0027130 | A1 | | 10/2001 | Namba et al. | |
| 2001/0030978 | A1 | | 10/2001 | Holloway et al. | |
| 2001/0034262 | A1 | | 10/2001 | Banyai | |
| 2001/0040345 | A1 | | 11/2001 | Au-Yeung | |
| 2002/0022511 | A1 | | 2/2002 | Eklund et al. | |
| 2002/0084335 | A1 | | 7/2002 | Ericson | |
| 2002/0171201 | A1 | | 11/2002 | Au-Yeung | |
| 2002/0187825 | A1 | | 12/2002 | Tracy et al. | |
| 2003/0050109 | A1 | | 3/2003 | Caro et al. | |
| 2003/0114210 | A1 | | 6/2003 | Meyer et al. | |
| 2003/0216185 | A1 | * | 11/2003 | Varley | 463/42 |
| 2004/0048670 | A1 | * | 3/2004 | Rowe | 463/42 |
| 2004/0076310 | A1 | | 4/2004 | Hersch et al. | |
| 2004/0097288 | A1 | * | 5/2004 | Sloate et al. | 463/42 |
| 2004/0106454 | A1 | * | 6/2004 | Walker et al. | 463/42 |
| 2004/0173965 | A1 | | 9/2004 | Stanek | |
| 2004/0178582 | A1 | | 9/2004 | Garrod | |
| 2004/0185931 | A1 | | 9/2004 | Lowell et al. | |
| 2004/0204222 | A1 | | 10/2004 | Roberts | |
| 2004/0259631 | A1 | | 12/2004 | Katz et al. | |
| 2004/0266514 | A1 | | 12/2004 | Penrice | |
| 2004/0266527 | A1 | * | 12/2004 | Anderson et al. | 463/36 |
| 2005/0014562 | A1 | * | 1/2005 | Fujimoto | 463/42 |
| 2005/0113173 | A1 | * | 5/2005 | Waters | 463/43 |

FOREIGN PATENT DOCUMENTS

| | | | |
|---|---|---|---|
| AU | B-21070/92 | | 7/1993 |
| AU | A-50327/96 | | 2/1997 |
| AU | B-52499/96 | | 2/1997 |
| AU | 199716432 | B2 | 9/1997 |
| AU | A-45403/97 | | 4/1998 |
| AU | A-63553/98 | | 10/1998 |
| DE | 2938307 | C2 | 4/1981 |
| DE | 3035898 | A1 | 4/1982 |
| DE | 3035947 | A1 | 5/1982 |
| DE | 2938307 | C3 | 6/1982 |

| | | | |
|---|---|---|---|
| DE | 29803107 | U1 | 8/1988 |
| DE | 3822636 | A1 | 1/1990 |
| DE | 2938307 | C3 | 8/1990 |
| DE | 3822636 | A1 | 1/1992 |
| DE | 3415114 | A1 | 10/1995 |
| DE | 19646956 | C1 | 5/1998 |
| DE | 19706286 | A1 | 5/1998 |
| DE | 29816453 | U1 | 4/1999 |
| DE | 19751746 | A1 | 5/1999 |
| EP | 0122902 | B1 | 4/1984 |
| EP | 0333934 | A1 | 9/1989 |
| EP | 0458623 | | 11/1991 |
| EP | 0798676 | A1 | 10/1997 |
| EP | 0799649 | A1 | 10/1997 |
| EP | 0149712 | A2 | 7/1998 |
| EP | 0874337 | A1 | 10/1998 |
| EP | 0896304 | A2 | 2/1999 |
| EP | 0914875 | A2 | 5/1999 |
| EP | 0914875 | A3 | 5/1999 |
| EP | 0919965 | A2 | 6/1999 |
| EP | 0983801 | A2 | 3/2000 |
| EP | 0983801 | A3 | 3/2001 |
| EP | 1149712 | A1 | 10/2001 |
| ES | 529535 | | 6/1983 |
| ES | 529536 | | 6/1983 |
| ES | 2006400 | | 4/1989 |
| ES | 2006401 | | 4/1989 |
| GB | 642892 | A | 9/1950 |
| GB | 2075918 | A | 11/1981 |
| GB | 2222712 | B | 3/1990 |
| GB | 2230373 | A | 10/1990 |
| GB | 2295775 | A | 12/1996 |
| GB | 3328311 | | 2/1999 |
| GB | 23282311 | A | 2/1999 |
| JP | 02235744 | | 9/1990 |
| JP | 04132672 | | 12/1992 |
| WO | WO85/02250 | A1 | 5/1985 |
| WO | WO91/17529 | | 11/1991 |
| WO | WO 98/03910 | | 1/1998 |
| WO | WO 98/40138 | | 9/1998 |
| WO | WO 99/09364 | A1 | 2/1999 |
| WO | WO 99/26204 | | 5/1999 |
| WO | WO 99/39312 | | 8/1999 |
| WO | WO00/00256 | | 1/2000 |
| WO | WO00/78418 | A1 | 12/2000 |
| WO | WO01/74460 | A2 | 11/2001 |
| WO | WO01/93966 | A1 | 12/2001 |
| WO | WO02/056266 | A1 | 7/2002 |

OTHER PUBLICATIONS

'Beginner's Guide—How to Bet', (www.plimico.com/How+to+wager/beginnersguide/), (Internet Article), 3 Pgs., [accessed May 25, 2005].

Chip Brown, 'Austin American-Statesman', (Article), May 28, 1998, 2 Pgs., Texas.

John C. Hallyburton, Jr., 'Frequently Asked Questions About Keno', (Internet Article),1995, 1998, 10 Pgs., (http://conielco.com/faq/keno.html).

'Horse betting Tutorial—Types of Bets' (www.homepokergames.com/horsebettingtutorial.php), (Internet Article), 2 Pgs., [accessed May 25, 2005].

Judith Gaines, 'Pool Party Betting Business Booming Throughout Area Workplaces', (Internet Article), Mar. 19, 1994, 2 Pgs., Issue 07431791, Boston Globe, Boston, MA.

'Maryland Launches Let It Ride', (Internet Article), Circa 2001,1 Pg.

'Notice of Final Rulemaking', (Internet Article) Mar. 24, 2000, 10 Pgs., vol. 6, Issue #13, Arizona Administrative Register, Arizona.

'How to Play Megabucks', (Internet Article), Mar. 9, 2001, 2 Pgs., Oregon Lottery Megabucks,(http://www.oregonlottery.org/mega/m_howto.htm).

'How to Play Megabucks', (Internet Article), May 8, 2001, 2 Pgs., Oregon Lottery Megabucks, (http://www.oregonlottery.org/mega/m_howto.htm).

'Oregon Lottery', (Internet Article), Apr. 30, 2004, 9 Pgs., Oregon Lottery Web Center, (http://www.oregonlottery.org/general/g_hist.shtml).

'Powerball Odd & Prizes', 'How to Play Powerball', (Internet Article), Dec. 2002, 2 Pgs., (www.powerball.com/pbhowtoplay.shtm).

'Powerball Prizes and Odds', (Internet Article), 2 Pgs., http://www.powerball.com/pbprizesNOdds.shtm, Dec. 2002.

'Learn to Play the Races' (Internet Article), 15 Pgs., Racing Daily Form (www.drf.com), Circa 2003.

Mike Parker, 'The History of Horse Racing' (Internet Article),1996, 1997,1998, 5 Pgs., http://www.mrmike.com/explore/hrhist.htm.

* cited by examiner

MEDIA ENHANCED GAMING SYSTEM

CROSS-REFERENCE TO RELATED APPLICATION

This application claims the benefit of U.S. Provisional Application No. 60/590,255, filed Jul. 22, 2004, the entirety of which is hereby fully incorporated herein by this reference.

BACKGROUND OF THE INVENTION

1. Field of the Invention

The invention relates generally to gaming and lottery systems. More particularly, the invention relates to systems, processes and controls that allow for the use of modern video and audio compression processes along with high-bandwidth communications circuits to bring media-rich services to the gaming and lottery environment.

2. Description of the Related Art

Traditionally, graphics and other media presented to the operators, players, and other persons present at a gaming establishment have been either pre-generated (canned) or message-based content. An example of such gaming system is an Keno game implemented by a state lottery authority. The graphic content resides on the gaming terminal and is presented through various interfaces. This content is either downloaded from the central data center(s) during off-hours or via background downloads during operational hours. Message-based content is pushed out to the gaming terminals from a centralized console and presented, usually via a dot-matrix type display. The security required to maintain system integrity typically prevents advanced computer features to the real time play of the game because of the need to protect the data flow of the game.

These relatively crude methods, by today's standards, places limits on both the quality of the content as well as the quantity of unique content to present. These deficiencies manifest themselves as players losing interest in the games quickly, which thereby results in lowered sales and/or participation. To attract players, increase their interest, and provide general information, the gaming industry has traditionally relied upon these rudimentary graphics and printed produces. What is needed, therefore, is a media-rich method for attracting and informing players of secure game offerings in a real-time environment.

SUMMARY OF THE INVENTION

The present invention provides an improved gaming system which overcomes some of the deficiencies of the known art. In one embodiment, the system is comprised of several hardware and software components which embody and enable core functionality. It is this core design that integrates known encoding schemes with new software and processes to enable ground-breaking media-rich delivery from a central site to remote gaming venues.

In one embodiment, the invention is a system for providing media to users at secure remote gaming locations that one or more secure gaming terminals located at remote locations on a communication network, with the one or more secure gaming terminals each allowing a user to play and wager in a game of chance. The system includes at least one media server on the communication network that determines the usable media for the one or more secure gaming terminals, such as multimedia, live video, etc. Then one or more media feeds in the system selectively feed media to the media server and the media server selectively distributes the appropriate media content from the one or more media feeds to the one or more secure gaming terminals, preferably during game play. The system can include an assistance server, such as a telephone call center to help the players and others at the remote terminals.

In one embodiment, the invention is a method of for providing media to users at secure remote gaming locations that includes the steps of hosting a game of chance at the one or more secure gaming terminals located at remote locations on a communication network, with the one or more terminals each allowing a user to play and wager in the game of chance, then feeding media content from one or media feeds to a media server, with the media server determining the usable media for the one or more secure terminals. The method then includes the step of distributing the appropriate media content from the media server to the one or more secure gaming terminals ate least during the game of chance.

The present invention therefore provides a media-rich environment at the secure gaming terminal that can both attract and inform players of secure game offerings, even in a real-time environment. Such function is advantageous because it increases player interest and can provide a simplified delivery of general information and instruction.

Other objects, features and advantages of the present application will before apparent after review of the hereinafter set forth Brief Description of the Drawings, Detailed Description of the Invention, and the Claims.

DETAILED DESCRIPTION OF THE INVENTION

Figure 1:
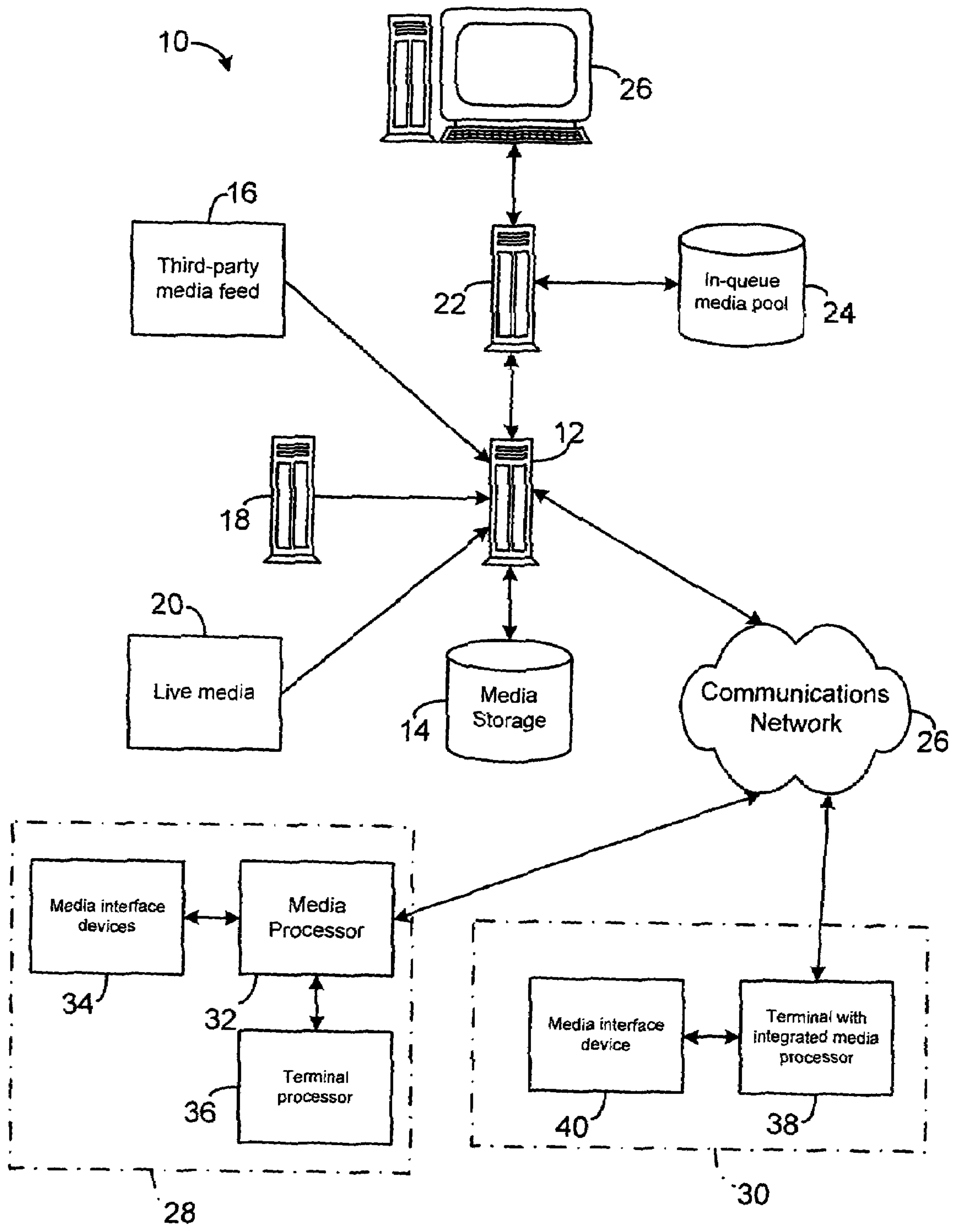
FIG. 1 is a schematic illustration of an embodiment of a media gaming system of the invention.

Referring now to the drawings in which like reference numbers indicate like parts throughout the several views, and in particular here to FIG. 1, the main content delivery system 10 is based upon a Media Server/Sequencer System 12, which is responsible for controlling content type, mix, and delivery. The uniqueness of this core device is found in the software and system interfaces driving its operation. The server will accept various types of media input via industry-standard hardware interfaces such as composite, component, and 5-video ports. Additional content is available via encoded media stored locally on a mass storage device 14 or over the communications network 26.

Standard raw media content is passed through the aforementioned standard hardware ports and encoded using well-known and available encoding algorithms. The various types of media that can be processed by the system could be third-party video feeds 16, computer generated graphics 18, and live broadcast content 20. It is the availability of this real-time media and the ability to deliver this content that differentiates this system from those traditionally used and currently available within the industry.

Once this media is available, the sequencing and control logic within the server provides a method to distribute the content to the desired gaming devices over the communications network 26. This distribution can entail a single remote device, a group of these devices, or the entire installed base of devices. The specialized software within the Media Server/Sequencer System 12 controls this distribution via standard Internet Protocol (IP) unicast, multicast, and broadcast methods.

For the far-end gaming terminal locations, two methods of providing media functionality can be utilized. In discrete system locations 28, the existing terminal device 36 is not capable of handling the media content. This could be due to either the terminal be a third-party device or not having the processing power/interfaces to accommodate this feature. In these instances, a separate Media Processor 32 with corresponding media interface devices 34 would be installed to permit delivery of content.

The integrated method is utilized where the terminal device is controlled by the system licensee and it has the ability to handle the media processing tasks. In this scenario at an integrated system remote location 30, the terminal with integrated media capabilities 38 contains the necessary software and interfaces to provide for the delivery of content. These interfaces handle the connections to the various media interface devices 40.

Due to the media-rich capabilities of the remote device locations, they now lend themselves easily to be a source of media input. Already containing a method of displaying video and producing audio output, the incorporation of readily available video camera and microphone technology provides the capability for the remote location to send video and audio back to the Media Server/Sequencing System 12. This capability enables video conferencing features that can be utilized by the Call Center Media Controller/Queuing System 22.

The Call Center Media Controller/Queuing System 22 is designed to function as an add-on system as well as a standalone offering to customers. Designed around the same core processes and functionality of the Media Server/Sequencer System 12, this system provides for real-time video conferencing contact between the remote device locations and a call center/help desk service.

The Call Center Media Controller/Queuing System 22 receives the encoded media streams from the remote locations through the same functionality that allows it to accept raw media input like its counterpart, the Media Server/Sequencer System 22. How it handles this media differently is a function of additional specialized programming. As in traditional call center telecommunications systems, there are times when all personnel are already assisting callers. The ability to handle this type of situation is handled by the queuing feature of the system.

Requests for conferencing sessions from remote locations route to the Call Center Media Controller/Queuing System 22. If there is an available call center technician, the session is routed through to the selected media-enabled workstation 26 where the technician answers the request. This action begins the two-way video conferencing session. If a technician is not available to immediately handle the session, the queuing controls process the session until the situation changes.

While in queue, the remote location can be controlled to display various informational messages. This entails a display that no technicians are available, the anticipated wait time, and possibly a logo or promotional graphic. Depending on bandwidth availability over the communications network 26, video-based promotional, technical, or informational content could be displayed. This content is pushed to the remote location from the In-queue Media Pool 24 which resides on a storage device within the server or other like device on the network. Once a call center technician becomes available, the remote session is passed through to the corresponding workstation 26.

Additional functionality is incorporated into this system through more specialized software features. The design features include tracking media and bandwidth capabilities of each individual remote location, real-time bandwidth monitoring of the network, current media sessions, and scheduled media events. These features enable the various functions provided by the system to remain in check and adjust their operation accordingly.

Due to the design of the communications network tying the remote locations back to where the system is housed, varying bandwidth capabilities may exist across the installation base. In order to account for this very possible design constraint, the per-location bandwidth available should be incorporated into the system so that it may adjust media content.

Since media capabilities and/or desires may vary by remote location, this fact should be considered also. Certain groups of remote locations may be members of a chain or corporate structure and thereby have unique needs or restrictions for content. There may also exist a need to provide content based upon regional areas. This capability would be very important should the system be utilized to broadcast weather alerts.

To take these factors into account and act accordingly, both the Media Server/Sequencer System 12 and the Call Center Media Controller/Queuing System 22 maintain a database containing pertinent information. Before establishing a stream or terminating a video conferencing session respectively, these systems will perform a call to the database to determine the best configuration or capability to carry the session. Information is also contained in this database that provides the system with the configuration of the backbone communications network so that it can adjust system-wide aggregate bandwidth utilization accordingly. When both systems are installed concurrently, one system can be designated to hold the primary database and the other the backup. Changes in information to the primary database are migrated to the backup database by system process. Each system has the capability to utilize the others database if corruption or other failure renders its own database unusable.

Similar to the database redundancy and failover capability, both systems are designed with the ability to be deployed in redundant sets. When this method is employed, either strictly for redundancy or for accommodating large installations of remotes, one system will be designated primary and others as backup units. Inter-machine processes on each server monitor the status and eligibility of other servers within the group and react accordingly should a failure occur.

A media scheduling process is contained within both the Media Server/Sequencer System 12 and the Call Center Media Controller/Queuing System 22. In the prior instance, this process controls media content and distribution based upon information contained within a separate scheduling database. In the latter it provides the ability to push out scheduled notices and informational content such as maintenance downtime and impairment releases. The database utilized is structured to control content distribution based on both time of day and remote location affected. An example using this feature would be the distribution of a corporate announcement at a particular time and only to those locations belonging to that corporate entity.

Figure 2:
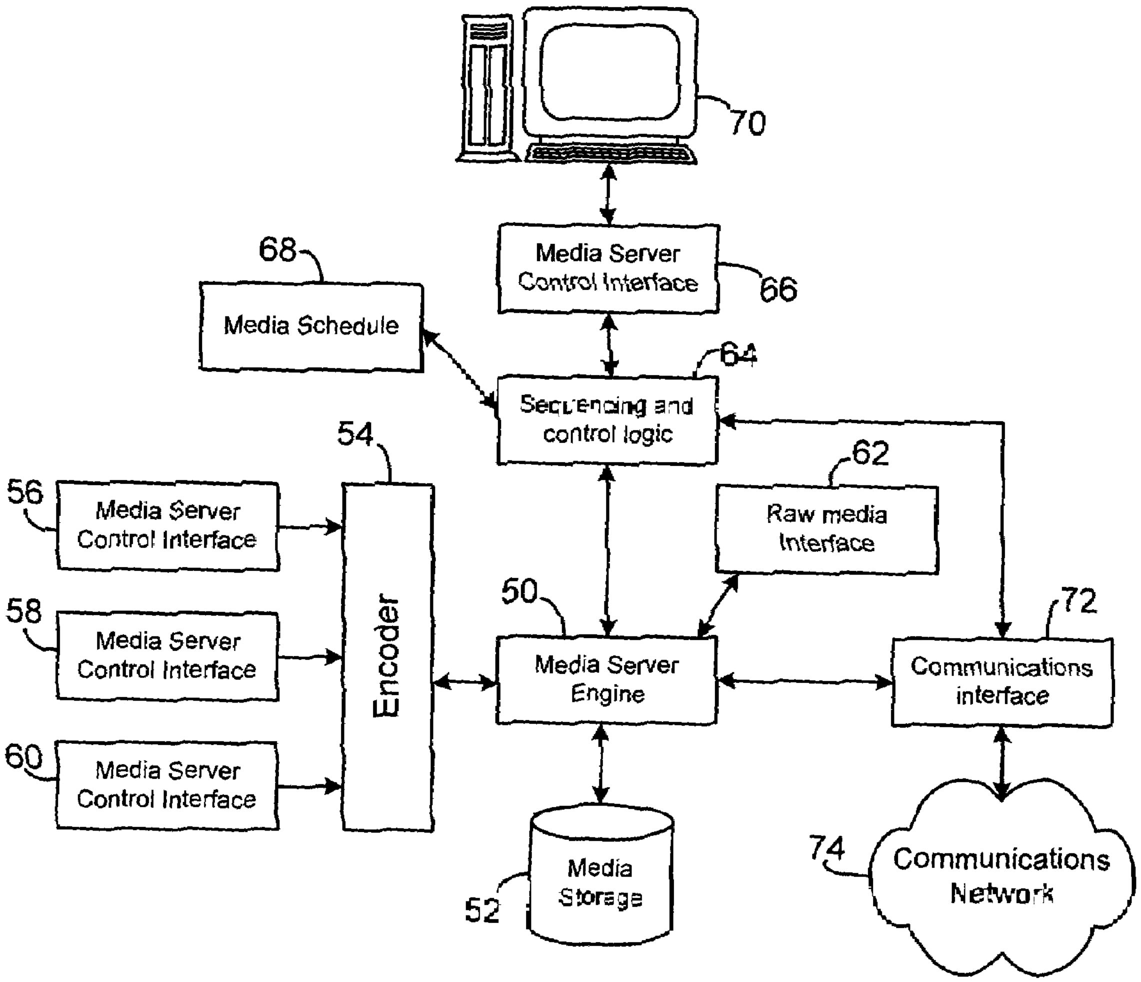
FIG. 2 is a schematic illustration of an embodiment of a media server of the invention.

The functional components of the Media Server/Sequencer System are shown in FIG. 2. At the heart of the system is the media server engine 50 which is tasked with distributing content based upon control input and automated operational monitoring sub-processes. Content control allows for multiple simultaneous streams of media based upon distribution commands from the server side or on-demand requests from remote terminal locations. Terminal, as used herein, herein refers to a terminal or a device adapted for gaming use and which is traditionally defined as a purpose-built unit that accepts and processes wagering transactions and also provides a wagering system interface to the user/operator.

This content control is provided for by the sequencing and control logic 64 process. Programming enables input from various sources to dictate content distribution. Additional inputs from the media server engine 50 and communications interface 72 provide for monitoring of system and network communications operational parameters. This feedback is an essential component of the system and provides for proper operation and utilization of resources.

Explained individually, the first input is provided for by the media schedule 68. This component is comprised of a database and an interface process to the sequencing and control logic 64. Entries into this database control the scheduled distribution of content and to which location(s) this content is directed. The data is maintained by interaction via the operator workstation 70. Date and time information as well as content and intended destination(s) is input into the database. At the prescribed moment, the proper content is pushed out to the intended recipient(s).

The second method for controlling the distribution of content is via commands entered directly into the system from the operator workstation 70. Content selection and recipient information is input via the GUI interface and passed to the sequencing and control logic 64 through the media server control interface 66. This latter process handles the human-machine I/O interface requirements and provides a method to adapt and present a standardized interface to the operator.

Other than providing a universal interface to the communications network media, the communications interface 72 provides feedback to the monitoring and control logic 64 on communications functioning as related to bandwidth utilization and impairments to the communication network 74. To make available content for distribution, the media server engine 50 has several sources which to draw from. First is a raw media interface 62 that is the gateway for pre-encoded external real-time media. Another source for pre-encoded media is drawing from media storage 52.

For interfacing with traditional video signals, the media server contains a process dedicated to encoding video signals utilizing well-known compression algorithms. The encoder 54 performs this function. It accepts these traditional signals through industry standard hardware interface adapters installed in the server. Media sources can consist of third-party feeds 56, computer generated graphics 58 input, and live media 60 such as from a broadcast studio. Besides providing real-time content sources, additional processes provide the ability to take these encoded inputs and buffer and/or store them to media storage 52 for later delivery.

Figure 3:
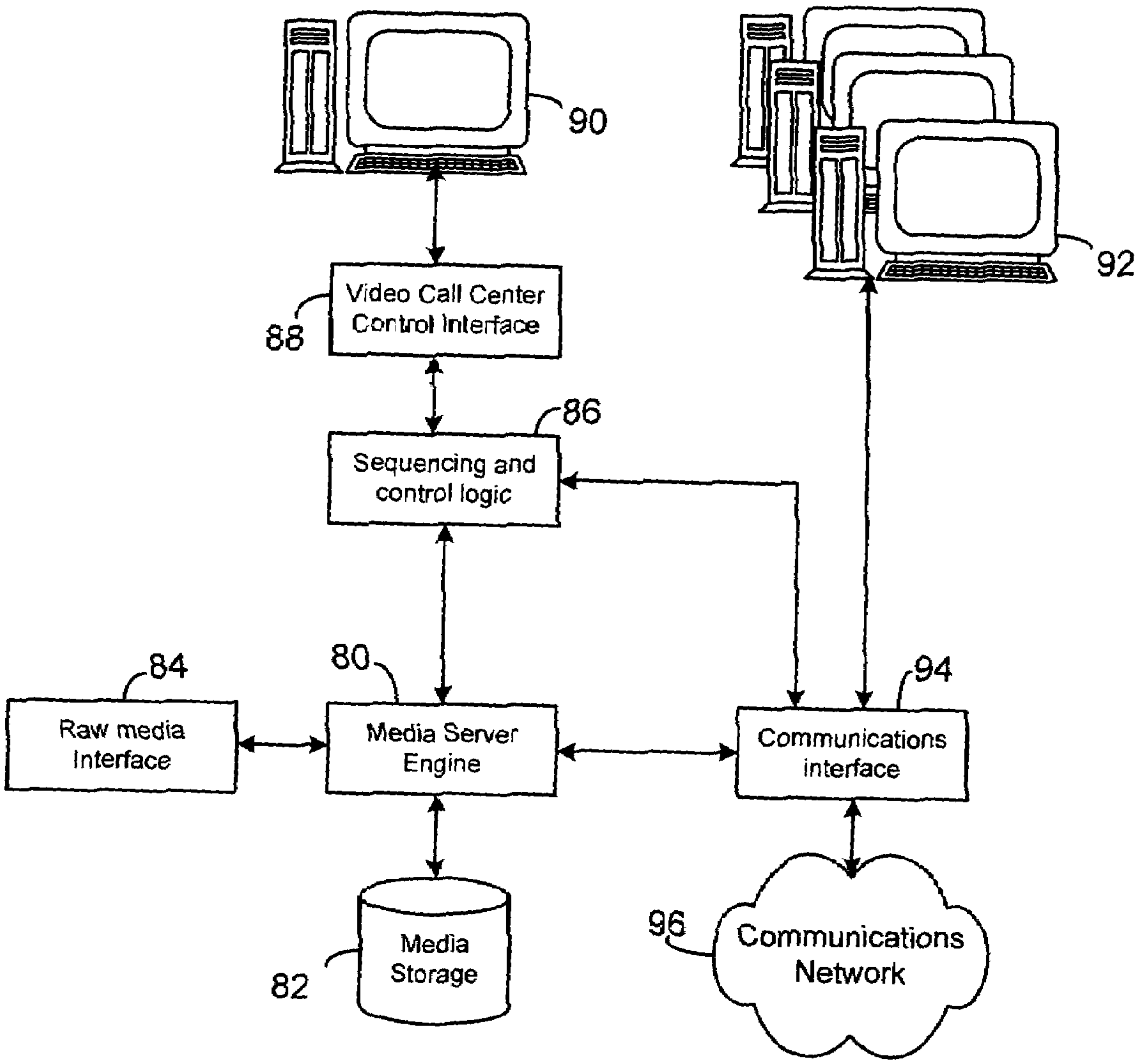
FIG. 3 is an illustration of a video call center for use with the invention.

Designed around the same core concept of the Media Server/Sequencer System is the Call Center Media Controller/Queuing System detailed next which can is illustrated in FIG. 3, which illustrates video call center detail. Being such, these two systems share many of the same components and logic. Because of the modular architecture of the systems, they are designed to allow deployment individually or as an integrated solution.

Once again, the media server engine 80 is responsible for controlling the flow of media streams to and from the system. Unique to this system is that it is designed to handle the routing of real-time two-way video conferencing traffic. This capability is provided for by the sequencing and control logic 86 process which listens for conferencing requests from stations, queue and routes these requests, and also oversees established conferences by way of a monitoring process through the communications interface 94.

The feedback received via the communications interface 94 allows the sequencing and control logic 86 to monitor communications network 96 utilization and adjust the operation of the system to prevent degradation to other activities that rely on the network.

System operation is controlled and monitored via the video call center control interface 88 from the master workstation 90. The design of the system allows for the master workstation 90 to be physically connected to the system or located elsewhere on the network. When the workstation is located on the network, no specialized client software is required and this allows for control of the system to be easily relocated to another workstation as when a shift change at the call center may dictate.

The video call center control interface 88 maintains a database of the media capabilities and other operational restraints for each remote location and call center workstations 92. In the case of remotes, limitations in the communication network 96 may reduce or preclude the capability for video conferencing and the system must tailor operation accordingly. For the call center workstations, the system must know which workstations are staffed, in conference, and available for service. Additionally, the video call center control interface 88 tracks in-progress conferences to calculate hold times for queued conference requests. This conference volume and hold time information is displayed on each call center workstation 92, master workstation 90, and can be pushed down to queued remotes.

Similar to modern voice-only call center software, the system provides the capability to determine the source of conference requests and perform a lookup within a database of location information. Basic details of in-process and queued conference session are displayed on each call center workstation 92 and the master workstation 90. The availability of this information alerts supervisors and technicians to session volume and location detail which allows them to recognize common denominators amongst the sessions that may indicate problems in the associated gaming system. When flagged for assignment of a new conference session, remote location detail and history information is displayed on the call center workstation 92 to enhance service and reduce conference times. This last function is very similar to the Computer Telephony Interface (CTI) utilized in standard call center software.

The video call center control interface 88 can either utilized its integrated database for remote location detail or interface to an external database via standard Structured Query Language (SQL) calls. This capability allows for a tight integration with an existing gaming system database and precludes the requirement to duplicate location information and associated updates across multiple independent databases.

In order to enhance system functionality it incorporates a capability to push notices and other informational messages out to remote locations, either preconceived or real-time. This delivery is controlled via the master workstation 90 and pulls content from media storage 82, the raw media interface 84, or via the communications network 96. The system is also designed to permit call center workstations 92 to place conference requests to remote locations. This feature allows technicians to proactively contact remote locations, perform follow-up/courtesy calls, and establishes a basis to enable telemarketing functions with the system.

Figure 4:
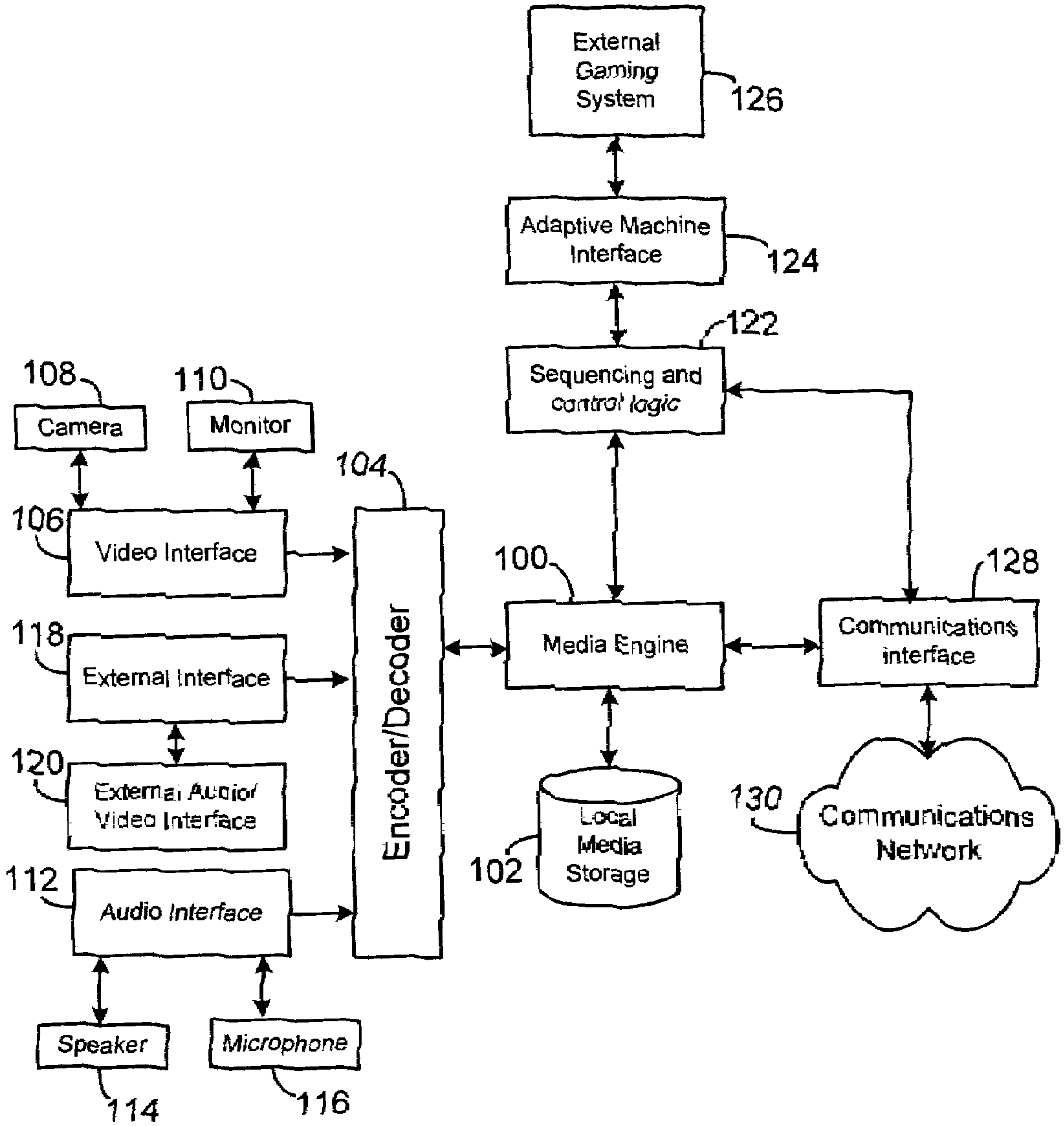
FIG. 4 is an illustration of a discrete terminal system for use with the invention.

To enable this media capability at remote locations, two methods can be utilized. Depending upon circumstances, on a per-remote location basis, either an integrated or discrete media processing system can be installed. The first method discussed will be that of a discrete configuration as detailed and referenced in FIG. 4, which illustrates a discrete terminal system.

The discrete method is utilized primarily when the existing remote device either can not be touched or is incapable of providing the required hardware and software integration. In this instance, a separate processor unit is installed and handles all media-related activities. This method could also be used to provide stand-alone media capabilities within a gaming establishment where media capabilities on a per-terminal basis are either not required or desired.

At the core of the discrete terminal system is the media engine 100 which directly controls and processes various media streams traversing the unit. Under command from the sequencing and control logic 122, the media engine 100 may establish, route, terminate, and otherwise control content flow. Content may be processed either across the communications network 130 via the communications interface 128, from local media storage 102, or from local external sources.

In the case of external sources, basic video conferencing media capability is provided for by means of a camera 108 and monitor 110 through the video interface 106 and also a speaker 114 and microphone 116 via the audio interface 112. The external monitor 110 and speaker 114 would be utilized in the case of pushed or streamed media to the remote location. Also available is an external interface 118 which provides a means to provide connectivity to external audio/video devices 120. This external interface 118 allows connection to existing or an otherwise available media distribution system that may exist within the remote location. The signals traversing these various interface are processed by the encoder/decoder 104 module utilizing well-know compression/decompression (Codec) algorithms.

The sequencing and control logic 122 also monitors real-time communications properties via a hook into the communications interface 128. This allows the sequencing and control logic 122 to be aware of communications network 130 utilization, current media sessions, and pending media requests. Video conferencing and on-demand media control is primarily handled by the sequencing and control logic 122 through user commands entered via integrated keyboard or touch-screen methods. To allow for interfacing with existing external systems 126, an adaptive machine interface 124 provides a common-ground capability. The media system may need to interface with traditional Point of Sale (POS) or other terminal devices.

Programming contained within the adaptive machine interface 124 allows the system to accept and provide information to external systems 126 through a separate software module. This module can be modified to present a standard interface to the systems on both sides of the interface without necessarily requiring unique modifications to the systems themselves. The result is a highly adaptable system that is capable of enabling rich media functions integrated with basic and/or legacy terminal devices.

Figure 5:
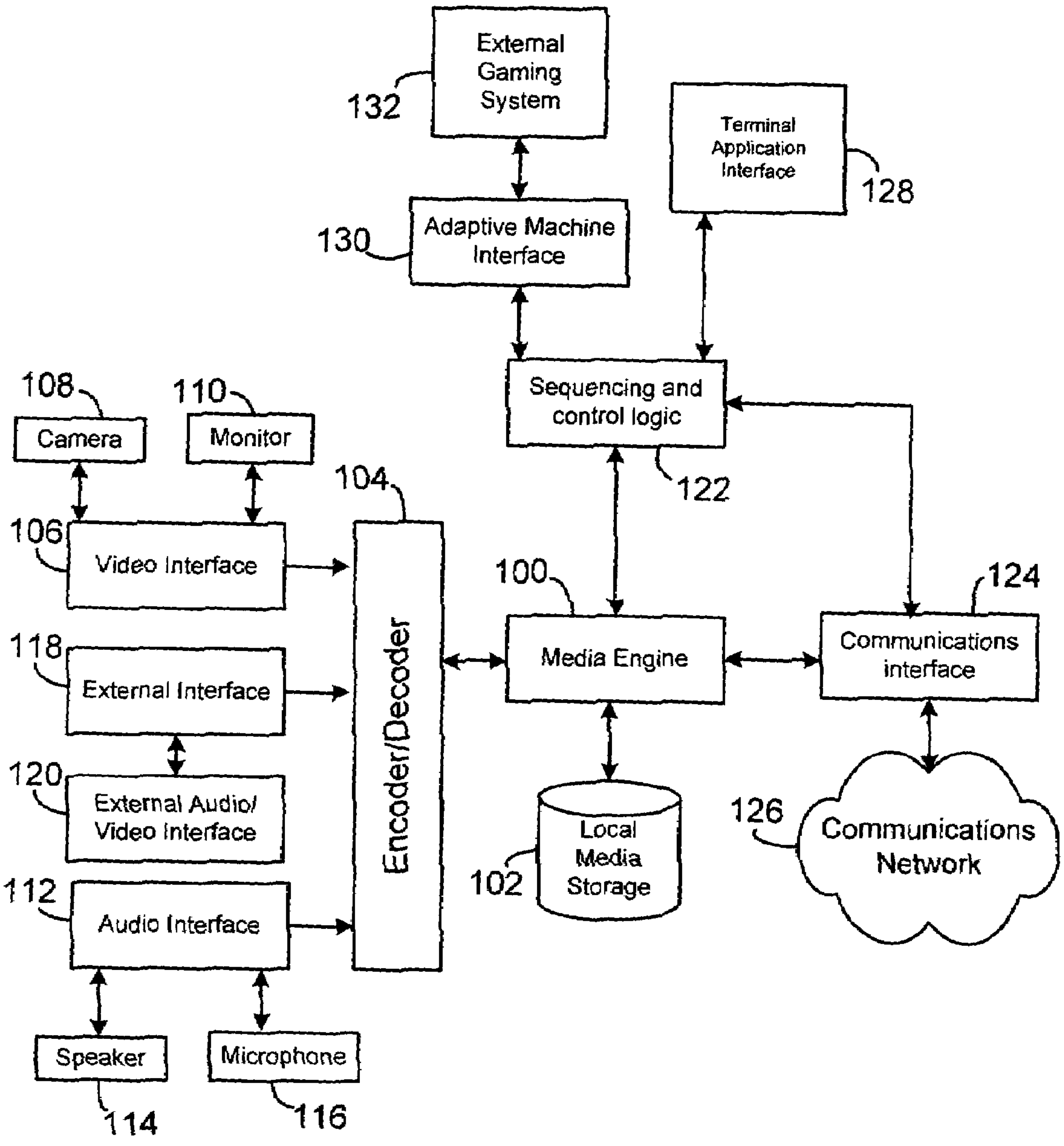
FIG. 5 is an illustration of an integrated terminal system for use with the invention.

The integrated terminal system, as diagramed and referenced in FIG. 5, which illustrates an integrated terminal system, and is utilized in instances where the remote terminal or system has the capability to accommodate the required hardware interfaces and software modules. The components and design of this integrated system is not much different than the discrete implementation (FIG. 4) and vary only in the means by which it interfaces with the pre-existing terminal application.

Once again, at the core of the integrated terminal system is the media engine 100 which directly controls and processes various media streams traversing the unit. Under command from the sequencing and control logic 122, the media engine 100 may establish, route, terminate, and otherwise control content flow. Content may be processed either across the communications network 126 via the communications interface 124, from local media storage 102, or from local external sources.

In the case of external sources, basic video conferencing media capability is provided once again by means of a camera 108 and monitor 110 through the video interface 106 and also a speaker 114 and microphone 116 via the audio interface 112. The external monitor 110 and speaker 114 would be utilized in the case of pushed or streamed media to the remote location. Also available is an external interface 118 which provides a means to establish connectivity to external audio/video devices 120. This external interface 118 allows connection to existing or an otherwise available media distribution system that may exist within the remote location.

The sequencing and control logic 122 also monitors real-time communications properties via a hook into the communications interface 124. This allows the sequencing and control logic 122 to be aware of communications network 126 utilization, current media sessions, and pending media requests. Video conferencing and on-demand media control is primarily handled by the sequencing and control logic 122 through user commands entered via integrated keyboard or touch-screen methods. To allow for interfacing with existing external systems 132 like that of the discrete terminal system, an adaptive machine interface 120 provides a common-ground capability. The media system may need to interface with traditional Point of Sale (POS) or other terminal devices and this capability provides that functionality.

Programming contained within the adaptive machine interface 130 allows the system to accept and provide information to external systems 132 through a separate software module. This module can be modified to present a standard interface to the systems on both sides of the interface without necessarily requiring unique modifications to the systems themselves. The result is a highly adaptable system that is capable of enabling rich media functions integrated with basic and/or legacy terminal devices.

Likewise, the terminal application interface 128 allows this same functionality and ease of adaptability to take place with the pre-existing terminal application. In some instances, the licensee will be installing the system on a third-party terminal device that is up to the task of handling the required media content and control. The terminal application interface 128 allows programming a discrete interface software module to allow for seamless interaction without requiring code changes to either the host application or media system core. In the case that the licensee installs the system on their own terminal device, the terminal application interface 128 can be written to provide a standard interface to the application software. In many instances, when a vendor offers multiple models of terminal devices, they will provide for standard interface specifications to external applications. The capability of this system to do likewise allows for portability of the media system across their compatible product line.

Figure 6:
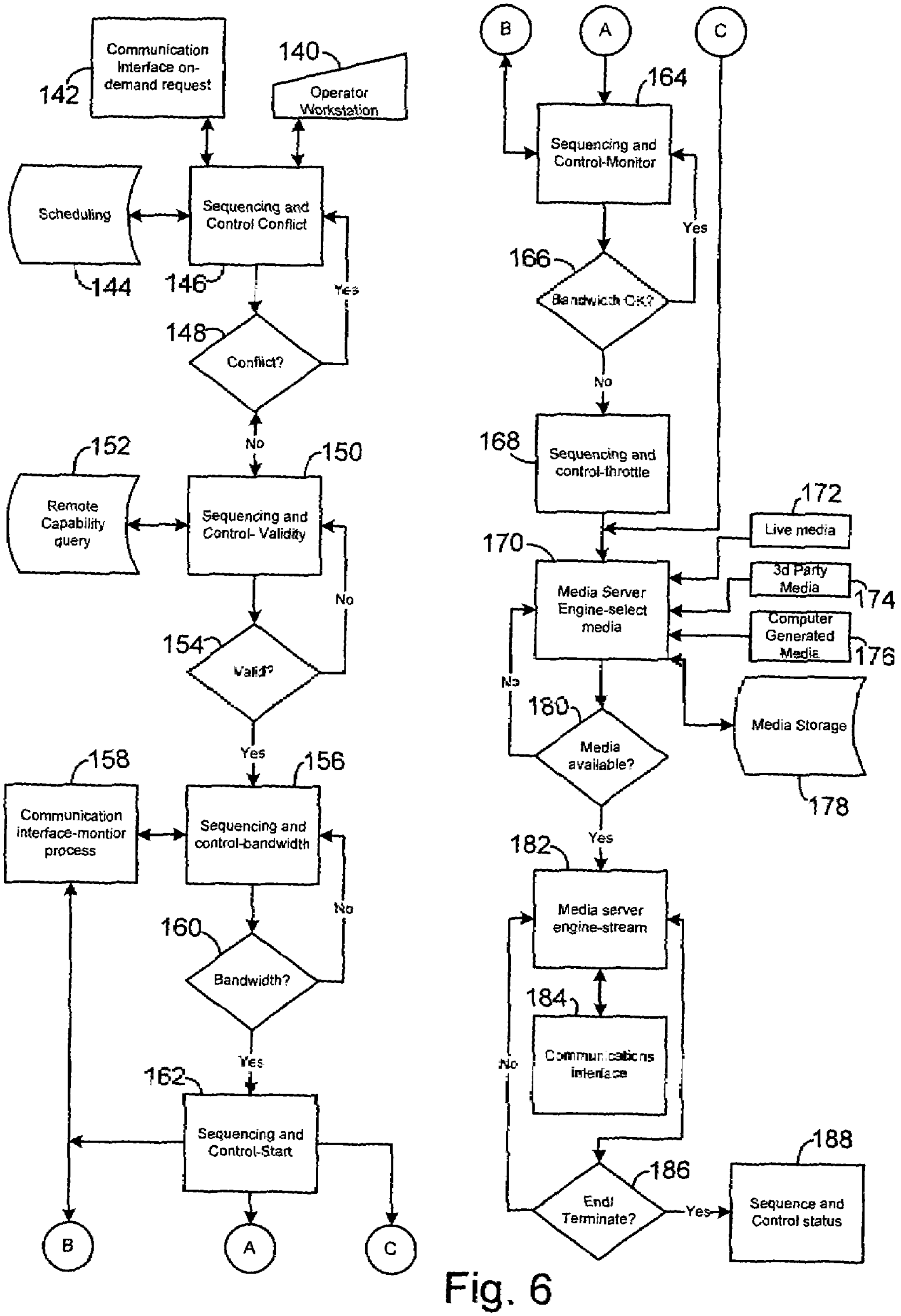
FIG. 6 is a flowchart of media server operations.

From and end-to-end viewpoint, the two systems described herein function along the same basic principals. However, the following text and diagrams will detail the overall interaction between the centralized server systems and remote terminal devices independently due to the distinct properties of each. The flow of processes within the Media Server/Sequencer System is detailed as shown in FIG. 6.

Media can be streamed to remotes utilizing several methods. The first is manually via the operator workstation 140, the next is with a prompt from the schedule 144, and lastly, from a on-demand request from a remote terminal 142. Prompts for these media triggers are validated for conflicts related to the time of this media session with sessions either imminent or already in progress that may be of higher priority, as shown by decision 148. If there is a conflict, the system will adjust according to schedule and notify the operator via the workstation 140 interface.

If a conflict does not exist, the sequencing and control process 150 queries the database for the remotes capability 152 to ensure that it is indeed capable of receiving the media feed. If the remote is flagged in the database as having a bandwidth limitation, the media feed is checked to see if it can be scaled back to fit within the available bandwidth. If the feed is valid (decision 154), the sequencing and control process 156 checks that this bandwidth (decision 160) is available on the communications network by interfacing with the communications interface monitoring process 158.

With bandwidth available, the sequencing and control process 162 sends a command to the media server engine 170 to start the proper media feed. It also informs the communications interface monitor process 158 that the media feed request has been placed. The sequencing and control process continues to monitor 164 the status and bandwidth 166 of the feed via interfaces with the communications interface monitor process 158 and the media server engine 170. If bandwidth must be reduced or the feed must be stopped, the sequencing and control process 168 sends the appropriate commands to the media server engine 170.

As part of the command to the media server engine 170 to start the feed, a direction as to what media and/or source is to be utilized to supply the given feed. The media server engine 170 selects the proper input from either third party media 172, computer generated media 174, live media 176, or media storage 178. If the media is not available (decision 180) the media server engine 170 notifies the sequencing and control monitor process 164 where the error is displayed on the operator workstation 140.

If the media is available, the media server engine 182 streams the video to the specified remote(s) via the communications interface 184. The media server engine 182 constantly listens for commands to end or otherwise terminate (step 188) the feed. Once the feed has ended or is terminated (decision 186), the media server engine 182 informs the sequencing and control monitor process 164.

Figure 7:
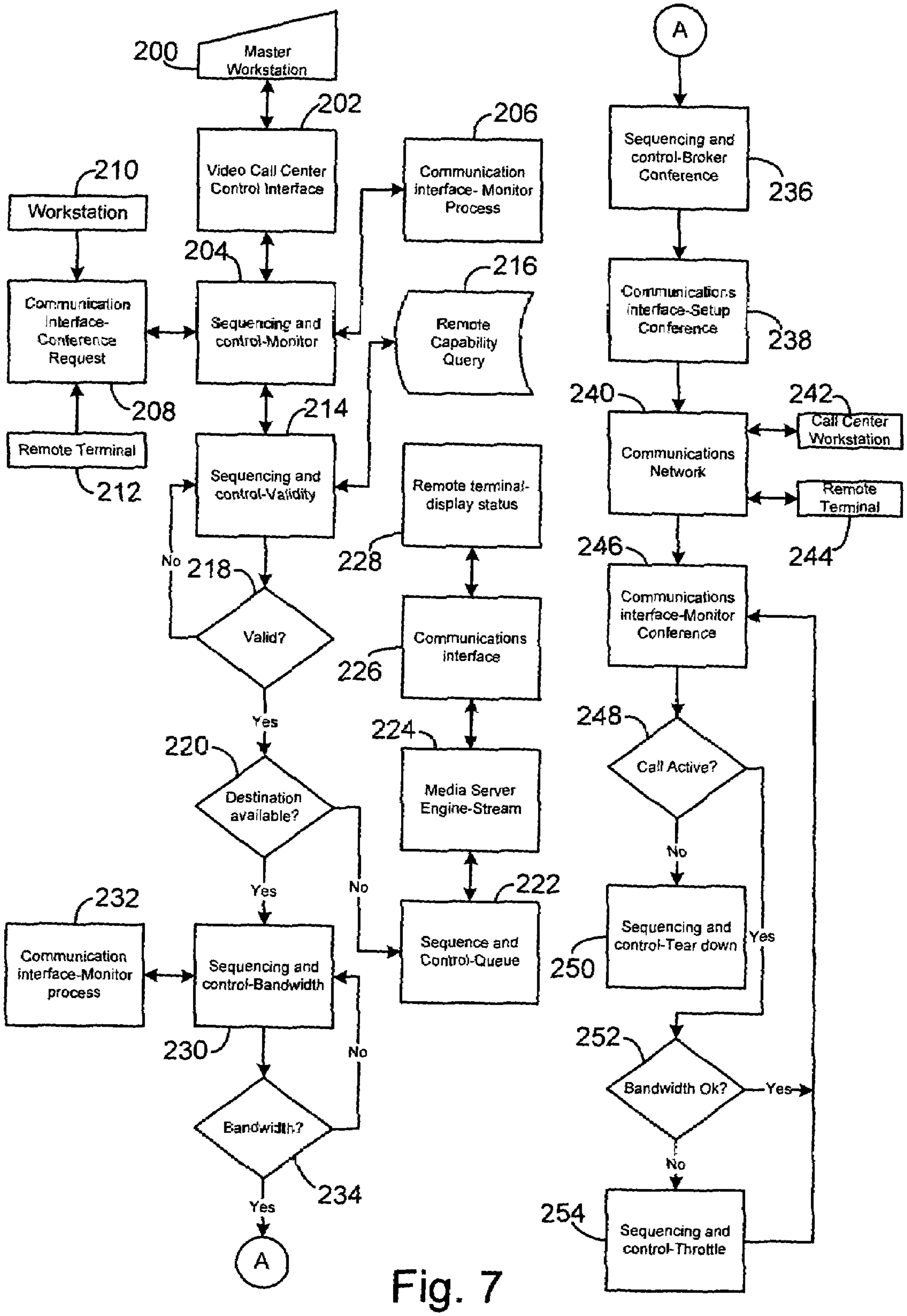
FIG. 7 is a flowchart of main conferencing operations.

The process flow for the setup and teardown of video conferencing sessions pertaining to the call center media controller/queuing system is detailed and referenced in FIG. 7. The sequencing and control monitor 204 process continually monitors sessions and network utilization via the communications interface monitor process 206. It also utilizes the communications interface to listen for conference requests 208 from call center workstations 210 and remote terminals 212. Continuous control and monitoring is available to the master workstation 200 via the video call center control interface 202.

Being that the call center workstations 210 are all capable of full conference features, the sequencing and control process 214 checks for remote capability 216 via a database query. If the request is not valid (decision 218), sequencing and control 214 handles the issue and sends a notice to the master workstation 200. If the request is valid, the sequencing and control process 214 next checks to see if the destination is available (decision 220).

If the destination is not available, the sequencing and control process 222 queues the request, makes note of the situation, and sends a request to the media server engine 224 to stream a hold time message to the destination 228 via the communications interface 226. If the destination is available at decision 220, the sequencing and control process 230 continues to process the connection.

The sequencing and control process 230 checks if bandwidth is available (decision 234) for the conference through the communications interface monitor process 232. If not, it will notify the initiator (if a call center workstation 210) that there is a bandwidth conflict and offer an option to queue the call or drop the request. If the initiator is a remote terminal 212, the sequencing and control process 230 will send a message advising of a busy status and queue the request.

With bandwidth available (decision 234), the sequencing and control process 236 will broker the call with the call center workstation 242 and the remote terminal 244 via the communications interface 238 and communications network 240. The communications interface setup conference 238 process is where the proper setup commands and addressing is specified to the conferencing endpoints. The communications interface monitor process 246 continuously monitors the conference for activity (decision 248) and bandwidth (decision 252) availability. If the call is not active at decision 248, the sequencing and control process tears down any remaining conference components, step 250. If bandwidth is a problem at decision 252, the sequencing and control process 254 throttles bandwidth of the conference accordingly.

Figure 8:
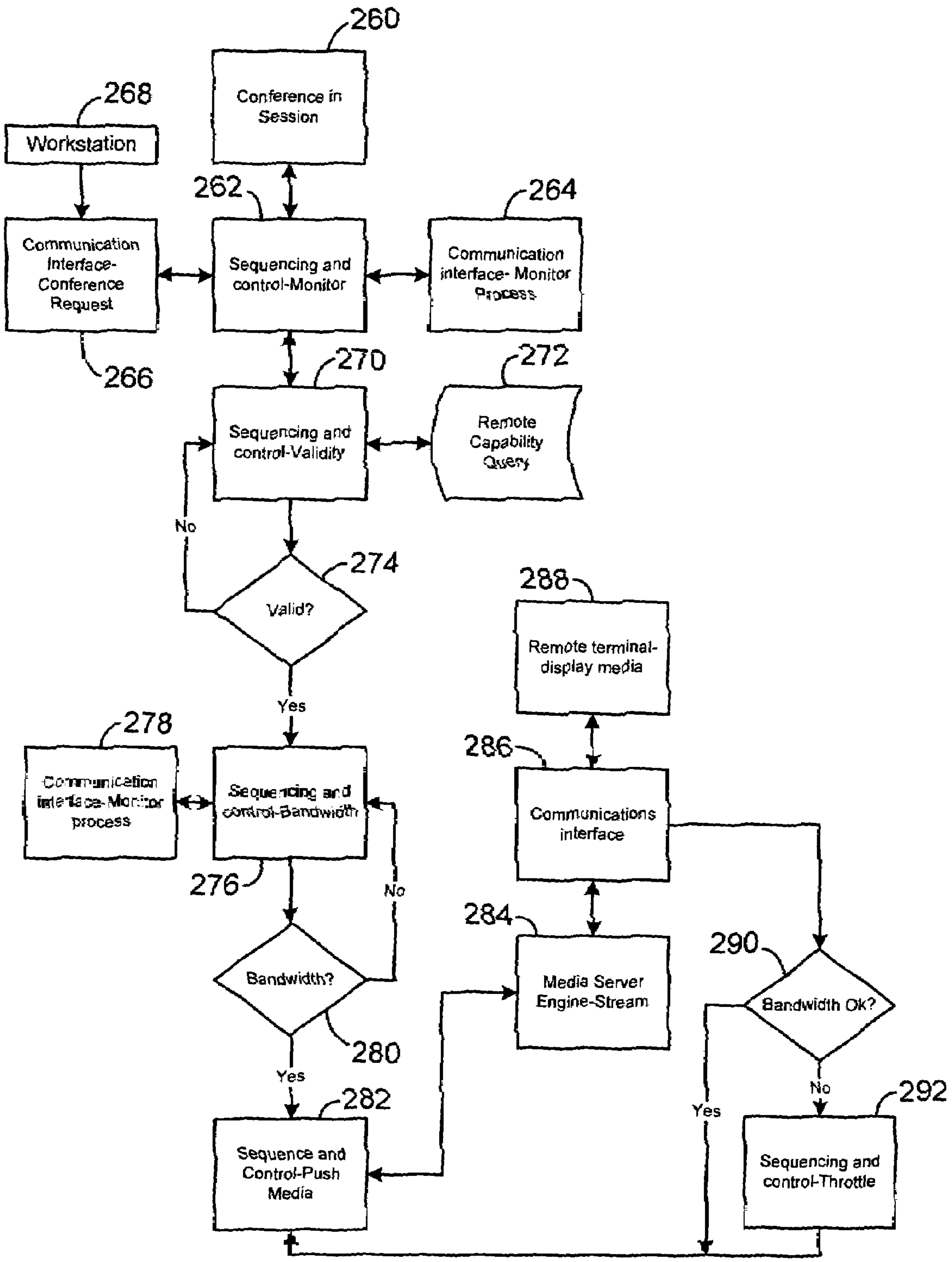
FIG. 8 is a flowchart of call center operations.

Once a conference is in session, the call center operator may want to stream media to the remote. This may be a help video or other way of assisting the remote conference caller. This associated process flow is depicted and annotated in the flowchart of FIG. 8.

The sequencing and control monitoring process 262 is actively handling a conference in session 260 and aware of media and other traffic on the communications network through the communications interface monitor process 264. A media push request is received from a call center workstation 268 through the communications interface 266. The first step will be for the sequencing and control process 270 to perform a remote capability query 272 in the database. This allows the system to validate (decision 274) the remote device ability to handle the media stream required.

Through the communications interface monitor process 278, the sequencing and control process 276 then checks for bandwidth capacity (decision 280) on the network. If bandwidth is not available at that time, the call center workstation 268 is notified of the situation and offered the opportunity to wait, cancel, or to push the media to the remote terminal in a near real-time fashion. In the latter instance, the media feed is pushed out to the remote as bandwidth permits and is buffered on the remote's storage device.

If bandwidth is available, the sequencing and control process 282 send a command to the media server engine 284 to send the media stream to the remote terminal 288 via the communications interface 286. The sequencing and control process 282 continues to monitor the feed through the communications interface 286. If bandwidth continues to be available (decision 290) the feed continues unchanged. If bandwidth utilization on the communications network changes and cannot continue to support the media feed at the current rate, the sequencing and control process 292 throttles down the rate and/or buffers the media stream on the remote terminal 288 to minimize the bandwidth impact.

Although several preferred embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein, and that many modifications and other embodiments of the inventions are intended to be included within the scope of the appended claims. Moreover, although specific terms are employed herein, as well as in the claims, they are used in a generic and descriptive sense only, and not for the purposes of limiting the described invention, nor the claims which follow below.

What is claimed is:

1. A system for providing media to users at secure remote lottery gaming locations, comprising:

one or more secure lottery gaming terminals located at remote locations on a communication network, the one or more secure lottery gaming terminals each allowing a user to play and wager in a lottery game of chance;

at least one media server on the communication network, the media server being capable of determining the usable media for the one or more secure lottery gaming terminals and encoding a live video;

a plurality of media feeds feeding media to the media server including at least one real-time third party video feed, the media server selectively distributing the encoded live video and appropriate media content from the media feeds to the one or more secure lottery gaming terminals during game play according to a scheduling database, the scheduling database having entries related to the date, time, and intended media content for the different respective remote gaming terminals, the scheduling database controlling the distribution of media content between different gaming terminals based on said entries such that a different combination of media is simultaneously sent to different gaming terminals; and at least one call center media controller configured for real-time video conferencing between the remote gaming terminals and a central call center service location for real-time assistance to players at the gaming terminals without interrupting game play.

2. The system of claim 1, wherein at least one of the media feeds is stored media.

3. The system of claim 1, wherein the call center media controller further comprises an assistance server on the network to selectively provide requested support to the one or more secure gaming terminals.

4. The system of claim 3, wherein the assistance server is a telephone call center.

5. The system of claim 1, wherein the system utilizes internet protocol (IP) on the communication network.

6. The system of claim 1, wherein the lottery game of chance is a sporting event.

7. A method of for providing media to users at secure remote lottery gaming locations, comprising the steps of:

hosting a lottery game of chance at one or more secure lottery gaming terminals located at remote locations on a communication network, the one or more lottery terminals each allowing a user to play and wager in the lottery game of chance;

feeding media content from one or more media feeds to a media server, the media content including at least one real-time third party video feed, the media server being capable of determining the usable media for the one or more secure lottery gaming terminals and encoding a live video; and distributing the encoded live video and appropriate media content from the media server to the one or more secure lottery gaming terminals during game play of the lottery game of chance according to a scheduling database, the scheduling database having entries related to the date, time, and intended media content for the different respective remote gaming terminals, the scheduling database controlling the distribution of media content between different gaming terminals based on said entries such that a different combination of media is simultaneously sent to different gaming terminals; and with a call center media controller, real-time video conferencing between the remote gaming terminals and a central call center service location for real-time assistance to players at the gaming terminals without interrupting game play.

8. The method of claim 7, wherein the steps of feeding media content and distributing the appropriate media content includes feeding and distributing stored media.

9. The method of claim 7, further comprising the step of providing support from an assistance server on the network to the one or more secure lottery gaming terminals via the call center media controller.

10. The method of claim 9, wherein the assistance server is a telephone call center and the step of providing support is providing telephonic assistance.

11. The method of claim 7, wherein the step of hosting a lottery game of chance is relaying data relative to a sporting event.

12. A system for providing media to users at secure remote gaming locations, comprising:

at least one lottery gaming means located at a remote location on a communication network, the lottery gaming means for allowing a user to play and wager in a lottery game of chance;

at least one media serving means on the communication network, the media serving means for determining the usable media for the at least one lottery gaming means for encoding a live video; and a plurality of media feeding means for selectively feeding media content to the media serving means, the media content including a real-time third party video feed;

wherein the at least one media serving means selectively encoding the live video and distributing the appropriate media content from the media feeding means to the at least one lottery gaming means during game play according to a scheduling database, the scheduling database having entries related to the date, time, and intended media content for the different respective remote gaming terminals, the scheduling database controlling the distribution of media content between different gaming terminals based on said entries such that a different combination of media is simultaneously sent to different gaming terminals; and means for real-time video conferencing between the remote gaming terminals and a central call center service location for real-time assistance to players at the gaming terminals without interrupting game play.

* * * * *